(12) United States Patent
Fujita

(10) Patent No.: US 7,238,418 B2
(45) Date of Patent: *Jul. 3, 2007

(54) HEAT RADIATION SHIELDING COMPONENT DISPERSION, PROCESS FOR ITS PREPARATION AND HEAT RADIATION SHIELDING FILM FORMING COATING LIQUID, HEAT RADIATION SHIELDING FILM AND HEAT RADIATION SHIELDING RESIN FORM WHICH ARE OBTAINED USING THE DISPERSION

(75) Inventor: Kenichi Fujita, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 10/660,745

(22) Filed: Sep. 12, 2003

(65) Prior Publication Data

US 2004/0071957 A1    Apr. 15, 2004

(30) Foreign Application Priority Data

Sep. 25, 2002  (JP) ............................ 2002-279037
Jul. 23, 2003  (JP) ............................ 2003-200275

(51) Int. Cl.
    *B32B 5/16*    (2006.01)
(52) U.S. Cl. .................. 428/328; 428/323; 106/287.18
(58) Field of Classification Search ..................... None
    See application file for complete search history.

(56) References Cited

U.S. PATENT DOCUMENTS 6,319,613 B1 *  11/2001  Takeda et al. .............. 428/412
6,620,872 B2 *  9/2003   Fisher ........................ 524/403
2004/0131845 A1 * 7/2004 Fujita ......................... 428/328

FOREIGN PATENT DOCUMENTS

| JP | 61-277437   | 12/1986 |
|----|-------------|---------|
| JP | 2-173060    | 7/1990  |
| JP | 5-78544     | 3/1993  |
| JP | 6-256541    | 9/1994  |
| JP | 6-264050    | 9/1994  |
| JP | 7-69632     | 3/1995  |
| JP | 10-146919   | 6/1998  |
| JP | 11-181336   | 7/1999  |
| JP | 2000-96034  | 4/2000  |
| JP | 2000-169765 | 6/2000  |
| JP | 2001-179887 | 7/2001  |

* cited by examiner

*Primary Examiner*—Monique R. Jackson
(74) *Attorney, Agent, or Firm*—Armstrong, Kratz, Quintos, Hanson & Brooks, LLP

(57) ABSTRACT

A heat radiation shielding component dispersion contains fine hexaboride particles and a polymer type dispersant in which the fine hexaboride particles are dispersed. The polymer type dispersant is mixed in the fine hexaboride particles in a proportion of from 0.3 part by weight or more to less than 50 parts by weight based on 1 part by weight of the fine hexaboride particles, and the dispersion does substantially not contain any organic solvent. A process for preparing the heat radiation shielding component dispersion is characterized by adding the polymer type dispersant to a dispersion in which fine hexaboride particles have been dispersed in an organic solvent, in a mixing proportion of from 0.3 part by weight or more to less than 50 parts by weight based on 1 part by weight of the fine hexaboride particles, and thereafter removing the organic solvent.

14 Claims, 1 Drawing Sheet

HEAT RADIATION SHIELDING COMPONENT DISPERSION, PROCESS FOR ITS PREPARATION AND HEAT RADIATION SHIELDING FILM FORMING COATING LIQUID, HEAT RADIATION SHIELDING FILM AND HEAT RADIATION SHIELDING RESIN FORM WHICH ARE OBTAINED USING THE DISPERSION

BACKGROUND OF THE INVENTION

1. Field of the Invention

This invention relates to a heat radiation shielding component dispersion used in producing heat radiation shielding forms (extruded or molded forms) containing a heat radiation shielding component, or producing heat radiation shielding products such as heat radiation shielding films formed by coating on transparent substrates of various types such as glass and resin a heat radiation shielding film forming coating liquid, and also relates to a process for preparing such a dispersion. More particularly, this invention relates to a heat radiation shielding component dispersion that can be free of any various restrictions as a dangerous object during transportation and also can not easily cause formation of a sediment caused by agglomeration of the heat radiation shielding component during storage, and relates to a process for preparing such a dispersion, and a heat radiation shielding film forming coating liquid, a heat radiation shielding film and a heat radiation shielding resin form which are obtained using such a dispersion.

2. Description of the Related Art

Solar radiations which enter various buildings and vehicles through their "openings" such as windows and doors include visible-light rays and besides ultraviolet radiations and infrared radiations. Among the infrared radiations included in such solar radiations, near-infrared radiations of 800 to 2,500 nm in wavelength are called heat radiations, and enter through the opening to cause a temperature rise in the room. In order to avoid such a temperature rise, in recent years, in the field of window materials for various buildings and vehicles, there is a rapid increase in demand for heat radiation shielding products which can shield heat radiations while taking in visible-light rays sufficiently and can prevent the temperature rise in the room while keeping brightness. Patents concerning such heat radiation shielding products are proposed in a large number.

For example, a heat radiation shielding sheet is proposed in which a heat radiation reflecting film comprising a transparent resin film on which a metal or a metal oxide has been vacuum-deposited is bonded to a transparent substrate such as a glass sheet, an acrylic sheet or a polycarbonate sheet (see Japanese Patent Applications Laid-open No. 61-277437, No. 10-146919, No. 2001-179887, etc.). However, this heat radiation reflecting film has a disadvantage that the film itself is very expensive and also requires a complicate process having a bonding step and so forth, resulting in a high cost. In addition, the heat radiation shielding sheet has a disadvantage that the adherence between the transparent substrate and the heat radiation reflecting film is not so good as to cause peeling of the film as a result of changes with time.

Heat radiation shielding sheets in which metals or metal oxides are directly vacuum-deposited on the surfaces of transparent substrates are also proposed in a large number. These, however, have a problem that, in producing such heat radiation shielding sheets, an apparatus is necessary which requires environment control in a high vacuum and in a high precision, resulting in a bad mass productivity and poor general-purpose properties.

Besides, also proposed are, e.g., a heat radiation shielding sheet, and a film used therefor, in which an organic infrared absorber typified by a phthalocyanine compound or an anthraquinone compound is kneaded into a thermoplastic transparent resin such as polyethylene terephthalate resin, polycarbonate resin, acrylic resin, polyethylene resin or polystyrene resin (see Japanese Patent Applications Laid-open No. 6-256541, No. 6-264050, etc.). However, in order to shield the heat radiations sufficiently, the infrared absorber must be mixed in a large quantity. Its mixing in a large quantity leaves a problem that the ability to transmit visible light rays may lower. Also, since an organic compound is used, their use in window materials or the like for buildings and vehicles which are always directly exposed to sunlight involves a difficulty in weatherability, and can not necessarily said to be appropriate.

Further proposed is, e.g., a heat radiation shielding sheet in which inorganic particles of titanium oxide having heat radiation reflectivity or mica or the like coated with titanium oxide are kneaded into a transparent resin such as acrylic resin or polycarbonate resin (see Japanese Patent Applications Laid-open No. 5-78544, No. 2-173060, etc). Such a sheet, however, requires addition of heat radiation reflecting particles in a large quantity in order to improve heat radiation shielding power, so that the visible-light transmission properties may lower with an increase in the quantity of the heat radiation reflecting particles mixed. On the other hand, the addition of heat radiation reflecting particles in a small quantity may bring an improvement in the visible-light transmission power but may result in a low heat radiation shielding power. Thus, there has been a problem that it is difficult to satisfy the heat radiation shielding power and the visible-light transmission power simultaneously. In addition, the mixing of heat radiation reflecting particles in a large quantity involves a problem in view of strength that substrates transparent resins may have low physical properties, in particular, a low impact resistance and a low toughness.

Under such technical backgrounds, the present applicants have taken note of hexaborides, which have free electrons in a large quantity, and have already proposed i) a heat radiation shielding film forming coating liquid having been so made up that fine particles of this hexaboride are dispersed as a heat radiation shielding component in an organic solvent and a binder of various types is added thereto, and ii) a heat radiation shielding film obtained by coating a transparent substrate of various types with this coating liquid, followed by curing (see Japanese Patent Applications Laid-open No. 11-181336, No. 2000-96034 and No. 2000-169765).

However, in such a technique, the coating liquid is made up presupposing a form in which the fine hexaboride particles are dispersed in an organic solvent. In this relation, there has been a problem that heat radiation shielding film forming coating liquids are handled as dangerous objects according to the Fire Services Act and are restricted in variety when the heat radiation shielding film forming coating liquids are transported, resulting in relatively high transportation cost.

As another problem, when dispersions in which the fine hexaboride particles stand dispersed as a heat radiation shielding component in an organic solvent are stored for a long term, the fine particles tend to agglomerate one another because of the Brown movement of fine particles (colloid particles) to cause a sediment in some cases.

As still another problem, when the fine hexaboride particles are kneaded into a transparent resin material to make an extruded or molded form, the fine hexaboride particles must uniformly be kneaded into the transparent resin material, removing the organic solvent in the state the fine hexaboride particles are dispersed in the solvent, and hence this can not necessarily be said to be the best method because the equipment and process used must be complicate.

SUMMARY OF THE INVENTION

The present invention has been made taking note of such problems. Accordingly, an object of the present invention is to provide a heat radiation shielding component dispersion that can be free of any various restrictions as a dangerous object during transportation and also can not easily cause formation of a sediment caused by agglomeration of the heat radiation shielding component during storage.

Another object of the present invention is to provide a process for preparing the heat radiation shielding component dispersion.

Still another object of the present invention is to provide a heat radiation shielding film forming coating liquid, a heat radiation shielding film and a heat radiation shielding resin form which are obtained using the heat radiation shielding component dispersion.

Specifically, the heat radiation shielding component dispersion according to the present invention, used to produce heat radiation shielding products, comprises:

fine particles of a hexaboride represented by $XB_6$, wherein X is at least one selected from Y, La, Ce, Pr, Nd, Sm, Eu, Gd, Tb, Dy, Ho, Er, Tm, Yb, Lu, Sr and Ca; and a polymer type dispersant in which the fine hexaboride particles are dispersed;

the hexaboride being a heat radiation shielding component, and the polymer type dispersant being mixed in the fine hexaboride particles in a proportion that the polymer type dispersant is from 0.3 part by weight or more to less than 50 parts by weight based on 1 part by weight of the fine hexaboride particles; and does substantially not contain any organic solvent.

The process for preparing the heat radiation shielding component dispersion according to the present invention comprises:

adding a polymer type dispersant to a dispersion in which fine particles of a hexaboride represented by $XB_6$, wherein X is at least one selected from Y, La, Ce, Pr, Nd, Sm, Eu, Gd, Tb, Dy, Ho, Er, Tm, Yb, Lu, Sr and Ca, have been dispersed in an organic solvent, in a mixing proportion that the polymer type dispersant is from 0.3 part by weight or more to less than 50 parts by weight based on 1 part by weight of the fine hexaboride particles; and thereafter removing the organic solvent.

The heat radiation shielding film forming coating liquid according to the present invention is characterized by being obtained by adding the heat radiation shielding component dispersion to an organic solvent to dissolve the polymer disperant, and adding a binder component.

The heat radiation shielding film according to the present invention is also characterized by being obtained by coating a substrate with the heat radiation shielding film forming coating liquid; and the heat radiation shielding resin form according to the present invention is characterized by being obtained by diluting and mixing the above heat radiation shielding component dispersion with a thermoplastic-resin form material, and forming (extruding or molding) the resulting mixture in a stated shape.

DESCRIPTION OF THE PREFERRED EMBODIMENTS

Figure 1:
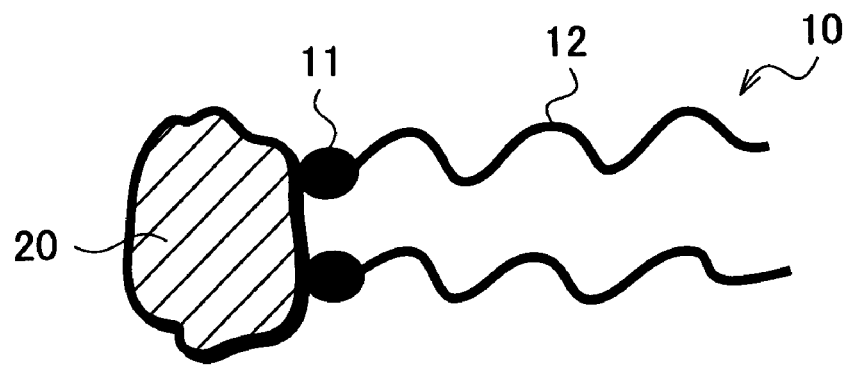
FIG. 1 is a diagrammatic view showing a state that a polymer type dispersant 10 has been adsorbed on a fine hexaboride particle 20.

The present invention is described below in detail.

The heat radiation shielding component dispersion according to the present invention is characterized in that the heat radiation shielding component fine hexaboride ($XB_6$) particles are uniformly dispersed in a polymer type dispersant which is not an organic solvent.

This heat radiation shielding component dispersion may be obtained by adding the polymer type dispersant to a dispersion in which the fine hexaboride ($XB_6$) particles have been dispersed in an organic solvent, and thereafter removing the organic solvent.

In the heat radiation shielding component dispersion, it is preferable for the organic solvent to have completely been removed. Since, however, it in actuality involves a difficulty to do so, the organic solvent may suffice to be substantially not contained. More specifically, the organic solvent may be allowed to remain in a very small quantity on condition that it is removed by the method of removing organic solvents which is described later.

The hexaboride used in the present invention may typically include yttrium hexaboride ($YB_6$), lanthanum hexaboride ($LaB_6$), cerium hexaboride ($CeB_6$), praseodymium hexaboride ($PrB_6$), neodymium hexaboride ($NdB_6$), samarium hexaboride ($SmB_6$), europium hexaboride ($UuB_6$), gadolinium hexaboride ($GdB_6$), terbium hexaboride ($TbB_6$), dysprosium hexaboride ($DyB_6$), holmium hexaboride ($HoB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$) and lanthanum-cerium hexaboride [$(La,Ce)B_6$].

As fine particles of the hexaboride used in the present invention, their surfaces may preferably not stand oxidized. In many cases, however, they usually stand slightly oxidized, and also it can not be avoided to a certain extent that the oxidation of surfaces takes place in the step of dispersing the fine particles. Even in such a case, however, there is no change in the effectiveness of showing heat radiation shielding effect. Hence, it is also possible to use fine hexaboride particles standing surface-oxidized.

These fine hexaboride particles also have a greater heat radiation shielding effect as they have a higher perfectness as crystals. However, even those having so low crystallizability as to form a broad diffraction peak in X-ray diffraction may be used in the present invention because they can show a heat radiation shielding effect as long as the basic bonds in the interiors of the fine particles consist of bonds between each metal and boron.

These fine hexaboride particles are also in the form of a powder having color such as grayish black, brownish black or greenish black. If, however, they are made to have a particle diameter sufficiently smaller than visible-light wavelength and brought into a state that they have been dispersed in the heat radiation shielding resin form or heat radiation shielding film, the visible-light transmission properties come therefrom in the heat radiation shielding product such as the heat radiation shielding resin form or the heat radiation shielding film. Nevertheless, the infrared shielding power can sufficiently be retained. The reason therefor has not been elucidated in detail. It is presumed that the free electrons in these fine particles are in a large quantity and the absorption energy of plasmon resonance and some indirect transition between bands that is due to free electrons in the interiors, and at the surfaces, of the fine particles is just in the vicinities of from visible to infrared, and hence the heat radiations in this wavelength region are selectively reflected and absorbed.

According to experiments, it has been observed that, in a film in which any of these fine particles has well finely and uniformly been dispersed, its transmittance has a maximum value at wavelengths between 400 nm and 700 nm and has a minimum value at wavelengths between 700 nm and 1,800 nm, and also that the difference in transmittance between these maximum value and minimum value is 15 points or more. Taking account of a hanging bell type that the visible-light wavelength is 380 nm to 780 nm and the visibility has a peak at about 550 nm, such a heat radiation shielding resin form or heat radiation shielding film has characteristics that it transmits visible light effectively and reflects and absorbs the other radiations effectively.

Here, the above fine hexaboride particles have very high heat radiation shielding power per unit weight. It has been ascertained that they exhibit their effect when they are used in an amount of 1/30 or less, compared with tin-doped indium oxide (ITO) and antimony-doped tin oxide (ATO) which are utilized as infrared radiation cut-off powders. Hence, the amount of the heat radiation shielding component to be used can vastly be cut down. This enables dissolution of the problem in view of strength that the transparent resin form or films may have low physical properties, in particular, a low impact resistance and a low toughness; the problem being caused when the heat radiation shielding component is mixed in the heat radiation shielding resin form or heat radiation shielding film in a large quantity. In addition, the fine hexaboride particles have absorption in the visible-light region when used in a large quantity, and hence the absorption in the visible-light region can freely be controlled by controlling the quantity of the particles to be added, also making it possible to adjust brightness or to apply the forms to privacy-protective parts or the like.

As to the particle diameter of the fine hexaboride particles used in the present invention, it may be arbitrary as long as they function as the heat radiation shielding component. The fine hexaboride particles may preferably have an average particle diameter of 1,000 nm or less, and more preferably 200 nm or less. This is because any fine particles having an average particle diameter larger than 1,000 nm or coarse particles formed by agglomeration of fine particles may act as a light scattering source of the heat radiation shielding resin form or heat radiation shielding film produced and the form or film looks cloudy. As the lower limit, there is no particular limitation. The fine hexaboride particles may preferably have particle diameter as small as possible, as long as such particles can be produced (actually, it is difficult to produce hexaboride particles having a diameter of less than 1 nm).

Meanwhile, transparent roofing materials or the like may be required to have light transmission properties which are opaque rather than transparent. In such a case, the heat radiation shielding transparent resin form may preferably be so constructed that particles having larger particle diameter are used so as to promote light scattering. However, particles larger than 1,000 nm may cause attenuation of the heat radiation shielding power itself, and hence they may preferably have the average particle diameter of 1,000 nm or less, and more preferably from 500 nm to 600 nm.

As the fine hexaboride particles used in the present invention, those having been surface-treated by coating with a silane compound, a titanium compound or a zirconia compound may be used. The treatment of fine-particle surfaces by coating with such a compound enables improvement in water resistance of the hexaboride.

Figure 2:
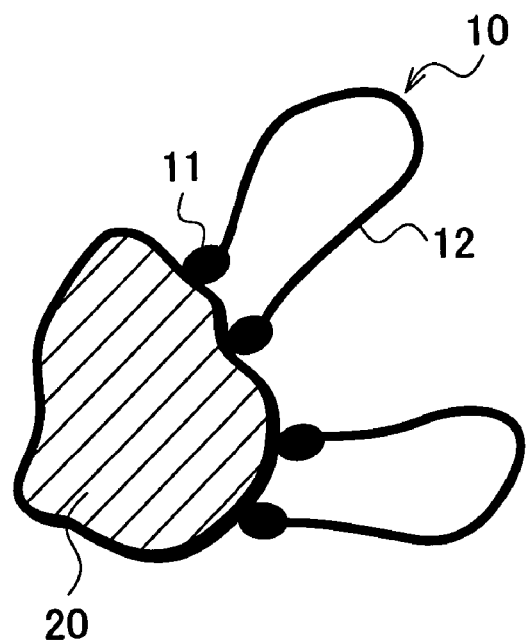
FIG. 2 is a diagrammatic view showing another state that a polymer type dispersant 10 has been adsorbed on a fine hexaboride particle 20.

As to the polymer type dispersant used in the present invention, as shown by reference numeral 10 in FIGS. 1 and 2, a polymeric material may be used which has functional groups 11 adsorbed on fine hexaboride particles 20 to serve as anchors, and also having polymer backbone chains 12 having an affinity for the organic solvent or thermoplastic resin form material. Such functional groups 11 may include amino groups, carboxyl groups, sulfonyl groups and salts of these, but without any particular limitations as long as they are functional groups having an affinity for the fine hexaboride particles. Preferred is a polymer type dispersant having a high transparency and having a high light ray transmittance in the visible light range.

Stated specifically, the polymer type dispersant may include polyacrylate type dispersants, polyurethane type dispersants, polyether type dispersants, polyester type dispersants and polyester-urethane type dispersants.

The polyacrylate type dispersants are exemplified by SN THICKNER A-850 and SN THICKENER A-815, trade names, available from San Nopko Limited; EFKA4500 and EFKA4530, trade names, available from Efka Additives B. V.; and DISPERBYK-116, a trade name, available from BYK-Chemie Co. The polyurethane type dispersants are exemplified by EFKA4046, EFKA4047 and EFKA4520, trade names, available from Efka Additives B. V.; and TEXAPHOR P60, TEXAPHOR P63 and TEXAPHOR P610, trade names, available from Cognis Co. The polyether type dispersants are exemplified by SN THICKENER A-801, SN THICKENER A-802, SN THICKENER A-803, SN THICKENER A-804 and SN THICKENER A-806, trade names, available from San Nopko Limited; and DISPARLON DA234 and DISPARLON DA325, trade names, available from Kusumoto Chemicals Ltd. The polyester type dispersants are exemplified by SOLSPERSE 22000, SOLSPERSE 24000SC, SOLSPERSE 22000GR, SOLSPERSE 26000, SOLSPERSE 27000, SOLSPERSE 28000, SOLSPERSE 36000, SOLSPERSE 36600 and SOLSPERSE 38500, trade names, available from Avecia Co.; and DISPARLON DA70350, DISPARLON DA705, DISPARLON DA725, DISPARLON DA860 and DISPARLON DA873A, trade names, available from Kusumoto Chemicals Ltd. Incidentally, the polymer type dispersant may be, as its state at room temperature, liquid, solid or gel-like, any of which may be used.

As to the mixing proportion of the polymer type dispersant to the fine hexaboride particles, it may be from 0.3 part by weight or more to less than 50 parts by weight, preferably from 1 part by weight or more to less than 30 parts by weight, and more preferably from from 2 parts by weight or more to less than 15 parts by weight, based on 1 part by weight of the fine hexaboride particles, which also depends on the dispersion particle diameter of the fine hexaboride particles. This is because, if the mixing proportion of the polymer type dispersant to 1 part by weight of the fine hexaboride particles is less than 0.3 part by weight, the fine hexaboride particles may agglomerate one another in the course the organic solvent is removed when the heat radiation shielding component dispersion is prepared, to make their dispersion in the dispersant insufficient, so that any dispersion in which the fine hexaboride particles have uniformly been dispersed in an organic solvent may be not obtainable even when the heat radiation shielding component dispersion obtained is added to the organic solvent to dissolve the polymer type dispersant. The haze value may also rise in the case of the resin form obtained by diluting and mixing the heat radiation shielding component dispersion with a thermoplastic-resin form material and extruding or molding the resulting mixture in a stated shape. If on the other hand the mixing proportion of the polymer type dispersant to 1 part by weight of the fine hexaboride particles is 50 parts by weight or more, it follows that the polymer type dispersant is contained in a large quantity in the resin form produced by the same method as the above using the resulting heat radiation shielding component dispersion, and hence a problem may arise such that the resin form itself has low physical properties, in particular, a low impact resistance or strength and a low toughness.

As to the solvent used when the heat radiation shielding component dispersion according to the present invention is prepared, it may include alcohols, esters, ketones, ethers and aromatic compounds. Taking account of efficiency at the time of removing the organic solvent in the stage of preparing the heat radiation shielding component dispersion, an organic solvent having a boiling point of 200° C. or less is preferred.

When the heat radiation shielding component dispersion according to the present invention is prepared, the fine hexaboride particles may be dispersed in the organic solvent by any method as long as it is a method by which the fine hexaboride particles are uniformly dispersed in the organic solvent. It may include, e.g., methods making use of a bead mill, a ball mill, a sand mill and ultrasonic dispersion. These methods enable preparation of the dispersion of fine hexaboride particles in which the fine hexaboride particles have been dispersed in any desired organic solvent.

When the heat radiation shielding component dispersion according to the present invention is prepared, as a method of removing the organic solvent, it may preferably be removed under reduced pressure at 100° C. or less. If it is dried at a high temperature of more than 100° C., the polymer type dispersant may undergo decomposition or polymerization, and the resulting heat radiation shielding component dispersion may have poor dispersibility in the organic solvent and in the thermoplastic-resin form material. The solvent may also be removed under normal pressure, but it takes a time to remove the organic solvent to make production efficiency poor. Thus, this can not be said to be an industrially suitable method. Accordingly, as a method of removing the organic solvent, taking account of the productivity and properties of the heat radiation shielding component dispersion, it may preferably be removed under reduced pressure at 100° C. or less.

As to the thermoplastic-resin form material used when the heat radiation shielding resin form is obtained using the heat radiation shielding component dispersion according to the present invention, there are no particular limitations as long as it is a transparent thermoplastic resin having high light transmission properties in the visible-light region. For example, it may include thermoplastic resins having, when the heat radiation shielding transparent resin form is formed in a plate of 3 mm in thickness, a visible-light transmittance of 50% or more as prescribed in JIS R 3106 and a haze of 30% or less as prescribed in JIS K 7105. Stated specifically, it may include polycarbonate resins, polyacrylate or -methacrylate resins, saturated polyester resins, cyclic olefin resins, polyimide resins, polystyrene resins, polyether-sulfone resins, and fluorine resins.

Where it is intended that the heat radiation shielding resin form obtained by diluting and mixing the heat radiation shielding component dispersion with the thermoplastic-resin form material and extruding or molding the resulting molten mixture in a stated shape is used in window materials or the like of various buildings and vehicles, preferred are polyacrylate or -methacrylate resins, polycarbonate resins, polyimide resins and fluorine resins taking account of transparency, impact resistance, weatherability and so forth.

As the polycarbonate resins, aromatic polycarbonates are preferred. The aromatic polycarbonates may include polymers obtained from at least one divalent phenolic compound typified by 2,2-bis(4-hydroxyphenyl)propane or 2,2-bis(3, 5-dibromo-4-hydroxyphenyl)propane and a carbonate precursor typified by phosgene or diphenyl carbonate, and by a known process such as interfacial polymerization, solution polymerization or solid-phase polymerization.

The polyacrylate or -methacrylate resins may include polymers or copolymers obtained using as a chief raw material methyl methacrylate, ethyl methacrylate, propyl methacrylate or butyl methacrylate and optionally using as a copolymer component an acrylic ester having an alkyl group having 1 to 8 carbon atoms, vinyl acetate, styrene, acrylonitrile or methacrylonitrile. Acrylic resins obtained by more multi-stage polymerization may also be used.

The fluorine resins may include polyfluoroethylene, polydifluoroethylene, polytetrafluoroethylene, an ethylene-difluoroethylene copolymer, an ethylene-tetrafluoroethylene copolymer and tetrafluoroethylene-perfluoroalkoxyethylene copolymers.

As methods of mixing the heat radiation shielding component dispersion according to the present invention and the thermoplastic-resin form material when the heat radiation shielding resin form is obtained, any methods may be selected as long as they are methods by which the fine hexaboride particles can uniformly be dispersed in the thermoplastic-resin form material. For example, a method may be used in which the heat radiation shielding component dispersion, pellets or powdery particles of the thermoplastic-resin form material and optionally other additive(s) are uniformly melt-mixed by means of a mixing machine such as a ribbon blender, a tumbling mixer, a Nauta mixer, a Henschel mixer, a super mixer or a planetary-screw mixer and a kneading machine such as a Banbury mixer, a kneader, a roll mill, a single-screw extruder or a twin-screw extruder.

The heat radiation shielding resin form may be produced by extruding or molding by a conventionally known method the molten mixture obtained by diluting and mixing the heat radiation shielding component dispersion with the thermoplastic-resin form material. The mixture may also be first made into pellets by means of a granulation machine, and thereafter made into the heat radiation shielding resin form by the same procedure.

As the shape of the heat radiation shielding resin form, the resin form may be formed in any shape as desired, and may be in a flat shape or a curved shape. As to the thickness of the heat radiation shielding resin form as well, it may be set to any desired thickness according to what is necessary for the shapes of a plate and up to a film. A resin sheet formed in a flat shape may be formed by post working in any desired shape such as a spherical shape.

As methods of forming the heat radiation shielding resin form, any methods such as injection molding, extrusion, compression molding and rotary molding are available. In particular, a method of obtaining the form by injection molding and a method of obtaining the form by extrusion may preferably be employed. As a method of obtaining a sheet- or platelike or filmlike form by the extrusion, such a form is produced by a method in which a molten thermoplastic resin extruded using an extruder such as a T-die is taken off while being cooled by means of a cooling roll. Forms obtained by the injection molding are preferably used in the bodies of cars such as window glass and roofs of automobiles. Sheet- or platelike or filmlike forms obtained by the extrusion are preferably used in constructions such as arcades and carports.

The heat radiation shielding component dispersion according to the present invention may further be mixed with any of commonly available additives. For example, usable as additives are dyes or pigments such as azo dyes, cyanine dyes, quinoline dyes, perylene dyes and carbon black which are commonly used to color thermoplastic resins in order to impart any desired color tones as occasion calls; as well as hindered-phenol type or phosphorus type stabilizers; release agents; hydroxybenzophenone type, salicylic acid type, HALS type, triazole type or triazine type ultraviolet absorbers; coupling agents; surface-active agents; antistatic agents and so forth; any of which may be mixed and used in an effective quantity.

The heat radiation shielding film forming coating liquid according to the present invention may be obtained by adding the heat radiation shielding component dispersion to the organic solvent to dissolve the polymer dispersant and disperse the fine hexaboride particles uniformly in an organic solvent, and adding a binder component. As this organic solvent, any solvent may be selected as desired, as along as it is a solvent capable dissolving the polymer type dispersant used. It may include the alcohols, esters, ketones, ethers and aromatic compounds described previously.

As the binder component, it is common to add an inorganic or organic binder component. The inorganic binder component may include, e.g., alkoxides of metals such as silicon, zirconium, titanium and aluminum, or partially hydrolyzed polymers of these alkoxides. As the organic binder component, conventionally known materials may widely be used, as exemplified by acrylic resins, thermoplastic polyurethane resins, polyamide resins, polyester type urethane resins, acrylic urethane resins and polyester resins. These binder components have the effect of improving the integrity to the substrate, of the heat radiation shielding film obtained after coating and curing, and also improving the hardness of coating films. On the heat radiation shielding film thus obtained, a film containing an inorganic or organic material like the above binder component may further be provided as a second layer so that the binding force of the heat radiation shielding film to the substrate and the hardness and weatherability of the coating film can more be improved.

The heat radiation shielding film forming coating liquid may be coated by any coating method without any particular limitations. Any methods may be employed as long as they are methods by which the coating liquid can be flatly, thinly and uniformly coated, as exemplified by spin coating, spray coating, dip coating, screen printing, roll coating, curtain coating and brush coating.

Thus, the heat radiation shielding component dispersion according to the present invention has the effect of reducing restrictions at the time of transportation or storage because, different from conventional dispersions in which fine hexaboride particles are directly dispersed in organic solvents, the present heat radiation shielding component dispersion does substantially not contain any organic solvent, and can be handled as non-dangerous objects according to the Fire Services Act. It also has the effect of remedying inconvenience in handling, because the problem has been solved which is the formation of sediment of fine hexaboride particles as a result of long-term storage that is seen in conventional dispersions in which the fine hexaboride particles have been dispersed in the organic solvent.

In the process for preparing the heat radiation shielding component dispersion according to the present invention, the process comprises adding the polymer type dispersant to the dispersion in which the fine hexaboride particles have been dispersed in an organic solvent, in the mixing proportion that the polymer type dispersant is from 0.3 part by weight or more to less than 50 parts by weight based on 1 part by weight of the fine hexaboride particles, and thereafter removing the organic solvent. This makes it possible to prepare the heat radiation shielding component dispersion simply and surely.

In the heat radiation shielding film forming coating liquid according to the present invention, it is obtained by adding the heat radiation shielding component dispersion to the organic solvent to dissolve the polymer dispersant, and adding the binder component. This makes it possible to obtain the heat radiation shielding film simply.

In the heat radiation shielding resin form, it is obtained by diluting and mixing the heat radiation shielding component dispersion with the thermoplastic-resin form material, and forming (extruding or molding) the resulting mixture in a stated shape. Hence, the heat radiation shielding film or the heat radiation shielding resin form, when used as materials for windows of automobiles and buildings, carports, arcades and so forth, have the effect of shielding the solar energy that may enter therethrough, to reduce a load of air conditioning (cooling) and lessen a feeling of the heat of humans, and at the same time have the effect of being useful for energy saving and having a high utility from an environmental viewpoint.

The present invention is described below in greater detail by giving Examples. The present invention is by no means limited by the following Examples.

In the following Examples, only examples making use of lanthanum hexaboride are described. It, however, has been ascertained that, like Examples disclosed in Japanese Patent Application Laid-open No. 2000-96034 as proposed by the present applicant, the same effect as that in the lanthanum hexaboride is obtainable in respect of other hexaborides as well.

EXAMPLE 1

75 g of fine lanthanum hexaboride particles of 67 nm in average particle diameter, 850 g of toluene and an appropriate amount of a polyacrylate polymer type dispersant (EFKA4530, trade name, available from Efka Additives B. V.; solid content: 50% by weight; methoxypropanol: 50% by weight) were mixed, and the mixture obtained was further mixed for 5 hours by means of a bead mill making use of zirconia beads of 0.3 mm in diameter to prepare a dispersion of fine lanthanum hexaboride particles ($LaB_6$ concentration: 6.5% by weight) (hereinafter "dispersion A").

To 500 g of the dispersion A, 840 g of a polyacrylate polymer type dispersant (EFKA4530, trade name, available from Efka Additives B. V.; solid content: 50% by weight; methoxypropanol: 50% by weight) was further added, and the solvent was completely removed under reduced pressure at 60° C. with stirring to obtain a heat radiation shielding component dispersion (LaB$_6$ concentration: 6.4% by weight) according to Example 1 (heat radiation shielding component dispersion A).

Here, the mixing proportion of the polymer type dispersant was 12.9 parts by weight based on 1 part by weight of the LaB$_6$.

Next, to a thermoplastic resin polycarbonate powder, the heat radiation shielding component dispersion A obtained was so added as to be in an LaB$_6$ concentration of 0.007% by weight, and these were uniformly mixed by means of a blender, followed by melt-kneading using a twin-screw extruder. The resulting kneaded product was extruded by means of a T-die into a sheet of 2.0 mm in thickness to obtain a heat radiation shielding resin form in which the fine lanthanum hexaboride particles stood uniformly dispersed in the whole resin. Optical characteristics of this heat radiation shielding resin form are shown in Table 1 below.

Here, the optical (spectral) characteristics of the heat radiation shielding resin form produced were measured with a spectrophotometer U-4000, manufactured by Hitachi Ltd., and visible-light transmittance and solar-radiation transmittance were calculated according to JIS R 3106. In Table 1, compositional data of heat radiation shielding resin forms obtained in Examples 1 to 5 and Comparative Example 1 are also shown together.

EXAMPLE 2

The procedure of Example 1 was repeated except that acrylic resin was used as the thermoplastic resin. The heat radiation shielding component dispersion A and acrylic resin powder were so added as to give the composition shown in Table 1, to obtain a heat radiation shielding resin form in which the fine lanthanum hexaboride particles stood uniformly dispersed in the whole resin. Optical characteristics of this heat radiation shielding resin form are also shown in Table 1.

EXAMPLE 3

The procedure of Example 1 was repeated except that polyethylene terephthalate resin was used as the thermoplastic resin. The heat radiation shielding component dispersion A and polyethylene terephthalate resin pellets were so added as to give the composition shown in Table 1, to obtain a heat radiation shielding resin form in which the fine lanthanum hexaboride particles stood uniformly dispersed in the whole resin. Optical characteristics of this heat radiation shielding resin form are also shown in Table 1.

EXAMPLE 4

The procedure of Example 1 was repeated except that ETFA (ethylene-tetrafluoroethylene copolymer) resin was used as the thermoplastic resin. The heat radiation shielding component dispersion A and ETFA resin pellets were so added as to give the composition shown in Table 1, to obtain a heat radiation shielding resin form in which the fine lanthanum hexaboride particles stood uniformly dispersed in the whole resin. Optical characteristics of this heat radiation shielding resin form are also shown in Table 1.

EXAMPLE 5

To 950 g of a dispersion A obtained in the same manner as in Example 1, 18 g of methyltrimethoxysilane was added, and these were stirred by means of a mechanical stirrer for 1 hour. Thereafter, the toluene in the dispersion A was removed using a spray dryer to obtain a powder of surface-treated fine lanthanum hexaboride particles (powder A).

Next, 50 g of the powder A, 500 g of toluene and an appropriate amount of a polyester polymer type dispersant (DISPARLON DA725, trade name, available from Kusumoto Chemicals Ltd.; solid content: 80% by weight; xylene: 20% by weight) were mixed, and the mixture obtained was further mixed for 1 hour by means of a bead mill making use of zirconia beads of 0.3 mm in diameter to prepare a dispersion of fine lanthanum hexaboride particles (LaB$_6$ concentration: 7% by weight) (hereinafter "dispersion B").

To 500 g of the dispersion B, 700 g of a polyester polymer type dispersant (DISPARLON DA725, trade name, available from Kusumoto Chemicals Ltd.; solid content: 80% by weight; xylene: 20% by weight) was further added, and the solvent was completely removed under reduced pressure at 60° C. with stirring to obtain a heat radiation shielding component dispersion (LaB$_6$ concentration: 5.5% by weight) (heat radiation shielding component dispersion B). Here, the mixing proportion of the polymer type dispersant was 16 parts by weight based on 1 part by weight of the LaB$_6$.

Then, in the same manner as in Example 1 the heat radiation shielding component dispersion B and polycarbonate resin powder were so added as to give the composition shown in Table 1, to obtain a heat radiation shielding resin form in which the fine lanthanum hexaboride particles stood uniformly dispersed in the whole resin. Optical characteristics of this heat radiation shielding resin form are also shown in Table 1.

EXAMPLE 6

A heat radiation shielding component dispersion A obtained in the same manner as in Example 1 was so added to toluene as to be in an LaB$_6$ concentration of 2.0% by weight, and these were uniformly mixed by means of a magnetic stirrer for 1 hour to prepare a fine lanthanum hexaboride particle dispersion in which fine LaB$_6$ particles stood uniformly dispersed in toluene (dispersion C).

Next, to an acrylic UV-curable resin solution (resin: 40% by weight; curing agent: 5% by weight; toluene: 50% by weight), the dispersion C obtained was so added as to be in an LaB$_6$ concentration of 0.5% by weight to prepare a heat radiation shielding film forming coating liquid (coating liquid A).

Then, this coating liquid A was coated on soda-lime glass of 3 mm in thickness by means of a bar coater No.24, followed by drying at 100° C. for 2 minutes and then irradiation by stated UV light to obtain a heat radiation shielding film on the glass.

Optical characteristics of this heat radiation shielding film were measured to find that the visible-light transmittance was 68.5% and the solar-radiation transmittance was 47.2%.

EXAMPLE 7

An ethyl silicate solution prepared using 10 g of Ethyl Silicate 40, available from Tama Chemical Co., Ltd., a tetra-to pentamer in degree of polymerization, 27 g of ethanol, 8 g of an aqueous 5% hydrochloric acid solution and 5 g of water was thoroughly mixed and stirred to prepare 50 g of a liquid ethyl silicate mixture (silicate solution A).

Next, a heat radiation shielding component dispersion A obtained in the same manner as in Example 1 was so added to ethanol as to be in an LaB$_6$ concentration of 2.0% by weight, and these were uniformly mixed by means of a magnetic stirrer for 1 hour to prepare a fine lanthanum hexaboride particle dispersion in which fine $LaB_6$ particles stood uniformly dispersed in ethanol (dispersion D).

Next, the silicate solution A and the dispersion D were mixed, and the mixture formed was further so diluted with deacetone alcohol to be in an $LaB_6$ concentration of 0.5% by weight and an $SiO_2$ concentration of 2.5% by weight to prepare a heat radiation shielding film forming coating liquid (coating liquid B).

This coating liquid B was coated on PET film of 0.1 mm in thickness by means of a bar coater No. 24, followed by heating at 100° C. for 30 minutes to obtain a heat radiation shielding film on the PET film.

Optical characteristics of this heat radiation shielding film were measured to find that the visible-light transmittance was 68.2% and the solar-radiation transmittance was 46.8%.

COMPARATIVE EXAMPLE 1

To a heat radiation shielding component dispersion A obtained in the same manner as in Example 1, 18.85 g of a polyacrylate polymer type dispersant (EFKA4530, trade name, available from Efka Additives B. V.; solid content: 50% by weight; methoxypropanol: 50% by weight), and the solvent was completely removed under reduced pressure at 60° C. with stirring to obtain a heat radiation shielding component dispersion ($LaB_6$ concentration: 40.5% by weight) (heat radiation shielding component dispersion C). Here, the mixing proportion of the polymer type dispersant was 0.29 part by weight based on 1 part by weight of the $LaB_6$.

Next, to a thermoplastic resin polycarbonate powder, the heat radiation shielding component dispersion C obtained was so added as to be in an $LaB_6$ concentration of 0.007% by weight, and these were uniformly mixed by means of a blender, followed by melt-kneading using a twin-screw extruder. The resulting kneaded product was extruded by means of a T-die into a sheet of 2.0 mm in thickness to obtain a heat radiation shielding resin form.

However, since the mixing proportion of the polymer type dispersant at the time of the preparation of the heat radiation shielding component dispersion C was as small as 0.29 part by weight based on 1 part by weight of the $LaB_6$, the fine $LaB_6$ particles agglomerated one another, and it was unable to disperse the fine $LaB_6$ particles uniformly in the heat radiation shielding component dispersion C, so that coarse particles were seen in the heat radiation shielding resin form obtained, and also the coarse particles served as light-scattering sources to make the heat radiation shielding resin form look cloudy, and not transparent.

Optical characteristics of this heat radiation shielding resin form are also shown in Table 1 below.

COMPARATIVE EXAMPLE 2

A heat radiation shielding component dispersion C obtained in the same manner as in Comparative Example 1 was so added to toluene as to be in an $LaB_6$ concentration of 2.0% by weight, and these were uniformly mixed by means of a magnetic stirrer for 1 hour. However, a sediment of fine $LaB_6$ particles having agglomerated was seen, and any dispersion was not obtainable in which the fine hexaboride particles stood uniformly dispersed.

TABLE 1

| Composition of heat radiation shielding component dispersion | | Composition of heat radiation shielding resin form | | | Optical characteristics | |
|---|---|---|---|---|---|---|
| Polymer type dispersant | | | $LaB_6$ | Resin form | Visible-light trans-mittance (%) | Solar radiation trans-mittance (%) |
| Type | Conc. (pbw) | Resin used | conc. (wt/%) | thickness (mm) | | |
| Example: | | | | | | |
| 1 Polyacrylate | 12.9 | Polycarbonate | 0.007 | 2.0 | 71.1 | 47.7 |
| 2 Polyacrylate | 12.9 | Acrylic | 0.007 | 2.0 | 70.5 | 48 |
| 3 Polyacrylate | 12.9 | PET | 0.07 | 0.2 | 72.1 | 48.5 |
| 4 Polyacrylate | 12.9 | ETFA | 0.07 | 0.2 | 71.9 | 48.4 |
| 5 Polyester | 16 | Polycarbonate | 0.007 | 2.0 | 70.9 | 47.9 |
| Comparative Example: | | | | | | |
| 1 Polyacrylate | 0.29 | Polycarbonate | 0.007 | 2.0 | 75.6 | 53.9 |

PET: Polyethylene terephthalate
ETFA: Ethylene-tetrafluoroethylene copolymer
Remarks:
(1) Numberical values of dispersant concentration in the column "Composition of heat radiation shielding component dispersion" indicate part(s) by weight based on 1 part by weight of the fine $LaB_6$ particles.
(2) In Example 5, surface-treated fine lanthanum hexaboride particles are used.

What is claimed is:

1. A heat radiation shielding component dispersion used to produce heat radiation shielding products, which comprises:
    fine particles of a hexaboride represented by $XB_6$, wherein X is at least one selected from the group consisting of Y, La, Ce, Pr, Nd, Sm, Eu, Gd, Tb, Dy, Ho, Er, Tm, Yb, Lu, Sr and Ca; and
    a polymer dispersant in which the fine hexaboride particles are dispersed;
    said hexaboride being a heat radiation shielding component, and said polymer dispersant being mixed in the fine hexaboride particles in a proportion that the polymer dispersant is from 0.3 part by weight or more to less than 50 parts by weight based on 1 part by weight of the fine hexaboride particles; and does not contain any organic solvent;

wherein said polymer dispersant has functional groups adsorbed on the fine hexaboride particles to serve as anchors, as well as polymer backbone chains having an affinity for an organic solvent or thermoplastic resin, and is at least one selected from the group consisting of a polyacrylate dispersant, a polyurethane dispersant, a polyether dispersant, a polyester dispersant and a polyester-urethane dispersant.

2. The heat radiation shielding component dispersion according to claim 1, wherein said fine hexaboride particles are particles having an average particle diameter of 1,000 nm or less.

3. The heat radiation shielding component dispersion according to claim 1, wherein said fine hexaboride particles have been surface-treated by coating with at least one selected from the group consisting of a silane compound, a titanium compound and a zirconia compound.

4. A heat radiation shielding component dispersion according to claim 1, 2 or 3, which has been prepared by a process which comprises adding a polymer dispersant to a dispersion in which fine particles of a hexaboride represented by XB6, wherein X is at least one selected from the group consisting of Y, La, Ce, Pr, Nd, Sm, Eu, Gd, Tb, Dy, Ho, Er, Tm, Yb, Lu, Sr and Ca, have been dispersed in an organic solvent, in a mixing proportion that the polymer type dispersant is from 0.3 part by weight or more to less than 50 parts by weight based on 1 part by weight of the fine hexaboride particles, wherein said polymer dispersant has functional groups adsorbed on the fine hexaboride particles to serve as anchors, as well as polymer backbone chains having an affinity for an organic solvent or thermoplastic resin, and is at least one selected from the group consisting of a polyacrylate dispersant, a polyurethane dispersant, a polyether dispersant, a polyester dispersant and a polyester-urethane dispersant; and thereafter removing the organic solvent.

5. A heat radiation shielding film forming coating liquid obtained by adding the heat radiation shielding component dispersion according to claim 1, 2 or 3, to an organic solvent to dissolve the polymer dispersant, and adding a binder component.

6. A heat radiation shielding film forming coating liquid obtained by adding the heat radiation shielding component dispersion according to claim 4, to an organic solvent to dissolve the polymer dispersant, and adding a binder component.

7. A heat radiation shielding film obtained by coating a substrate with the heat radiation shielding film forming coating liquid according to claim 5.

8. A heat radiation shielding film obtained by coating a substrate with the heat radiation shielding film forming coating liquid according to claim 6.

9. A heat radiation shielding resin form obtained by diluting and mixing the heat radiation shielding component dispersion according to claim 1, 2 or 3, with a thermoplastic-resin form material, and forming the resulting mixture in a stated shape.

10. A heat radiation shielding resin form obtained by diluting and mixing the heat radiation shielding component dispersion according to claim 4, with a thermoplastic-resin form material, and forming the resulting mixture in a stated shape.

11. The heat radiation shielding resin form according to claim 9, wherein said thermoplastic-resin form material is at least one selected from the group consisting of a polycarbonate resin, a polyacrylate or -methacrylate resin, a saturated polyester resin, a cyclic olefin resin, a polyimide resin, a polyether-sulfone resin and a fluorine resin.

12. The heat radiation shielding resin form according to claim 10, wherein said thermoplastic-resin form material is at least one selected from the group consisting of a polycarbonate resin, a polyacrylate or -methacrylate resin, a saturated polyester resin, a cyclic olefin resin, a polyimide resin, a polyether-sulfone resin and a fluorine resin.

13. A process for preparing a heat radiation shielding component dispersion, which comprises:

adding a polymer dispersant to a dispersion in which fine particles of a hexaboride represented by $XB_6$, wherein X is at least one selected from the group consisting of Y, La, Ce, Pr, Nd, Sm, Eu, Gd, Tb, Dy, Ho, Er, Tm, Yb, Lu, Sr and Ca, have been dispersed in an organic solvent, in a mixing proportion that the polymer dispersant is from 0.3 part by weight or more to less than 50 parts by weight based on 1 part by weight of the fine hexaboride particles, wherein said polymer dispersant has functional groups adsorbed on the fine hexaboride particles to serve as anchors, as well as polymer backbone chains having an affinity for an organic solvent or thermoplastic resin, and is at least one selected from the group consisting of a polyacrylate dispersant, a polyurethane dispersant, a polyether dispersant, a polyester dispersant and a polyester-urethane dispersant; and thereafter removing the organic solvent.

14. The process for preparing a heat radiation shielding component dispersion according to claim 13, wherein said organic solvent is removed under reduced pressure at 100° C. or less.

* * * * *